United States Patent
Brown et al.

(10) Patent No.: US 7,413,047 B2
(45) Date of Patent: Aug. 19, 2008

(54) ALCOHOL IGNITION INTERLOCK SYSTEM AND METHOD

(76) Inventors: Betty J. Brown, 11316 Narrow Trail Ter., Beltsville, MD (US) 20705; Annie D. Minter, 11316 Narrow Trail Ter., Beltsville, MD (US) 20705

( * ) Notice: Subject to any disclaimer, the term of this patent is extended or adjusted under 35 U.S.C. 154(b) by 309 days.

(21) Appl. No.: 11/089,362

(22) Filed: Mar. 25, 2005

(65) Prior Publication Data

US 2005/0230175 A1    Oct. 20, 2005

Related U.S. Application Data

(60) Provisional application No. 60/521,383, filed on Apr. 14, 2004.

(51) Int. Cl.
*B60K 28/06* (2006.01)

(52) U.S. Cl. .................... 180/272; 340/576

(58) Field of Classification Search .............. 180/272; 340/576
See application file for complete search history.

(56) References Cited

U.S. PATENT DOCUMENTS

| | | | |
|---|---|---|---|
| 3,811,116 A * | 5/1974 | Takeuchi et al. ............ 600/437 |
| 3,831,707 A | 8/1974 | Takeuchi |
| 4,093,945 A * | 6/1978 | Collier et al. ............... 180/272 |
| 4,592,443 A | 6/1986 | Simon |
| 4,689,603 A | 8/1987 | Conigliaro et al. |
| 4,738,333 A | 4/1988 | Collier et al. |
| 4,809,810 A | 3/1989 | Elfman et al. |
| 4,901,058 A | 2/1990 | Comeau et al. |
| 4,926,164 A | 5/1990 | Porter et al. |
| 4,996,161 A | 2/1991 | Conners et al. |
| 5,020,628 A | 6/1991 | Bigliardi et al. |
| 5,372,135 A | 12/1994 | Mendelson et al. |
| 5,426,415 A | 6/1995 | Prachar et al. |
| 5,719,950 A | 2/1998 | Osten et al. |
| 5,743,349 A | 4/1998 | Steinberg |
| 5,944,661 A | 8/1999 | Swette et al. |
| 6,229,908 B1 | 5/2001 | Edmonds, III et al. |
| 6,967,581 B2 * | 11/2005 | Karsten ........................ 340/576 |
| 2002/0121981 A1 | 9/2002 | Munch |

(Continued)

FOREIGN PATENT DOCUMENTS

JP        57-140232        8/1982

(Continued)

*Primary Examiner*—Kevin Hurley
*Assistant Examiner*—Drew J. Brown
(74) *Attorney, Agent, or Firm*—Richard C. Litman (57) ABSTRACT

The alcohol ignition interlock system and method has a transdermal blood alcohol concentration blood alcohol concentration reader in combination with a vehicle ignition interlock circuit that prevents an intoxicated person from operating a vehicle. The blood alcohol concentration reader utilizes a sensor that continuously measures very low levels of transdermal alcohol mounted on the steering wheel of the vehicle beneath a porous cover. The readings are communicated to a microprocessor-controlled control unit and ignition interlock circuitry that either enables or disables start-up of the vehicle, as well as continued operation thereof. Not only does the system prevent an intoxicated person from starting the vehicle, but should the system detect the driver's subsequent intoxicated state while in operation of the vehicle, the driver is given a period of time and distance in which to pull off the road prior to the ignition system being disabled.

20 Claims, 6 Drawing Sheets

U.S. PATENT DOCUMENTS

2003/0120139 A1* 6/2003 Duval et al. .................. 600/363
2005/0087382 A1* 4/2005 Bellehumeur ............... 180/272
2005/0099310 A1* 5/2005 Jones ......................... 340/576
2006/0237252 A1* 10/2006 Mobley et al. .............. 180/272
2006/0237253 A1* 10/2006 Mobley et al. .............. 180/272

FOREIGN PATENT DOCUMENTS

JP      8-150853      6/1996

* cited by examiner

ALCOHOL IGNITION INTERLOCK SYSTEM AND METHOD

CROSS-REFERENCE TO RELATED APPLICATION

This application claims the benefit of U.S. Provisional Patent Application Ser. No. 60/521,383, filed Apr. 14, 2004.

BACKGROUND OF THE INVENTION

1. Field of the Invention

The present invention relates to vehicle safety devices, and more particularly to an alcohol ignition interlock system and method by which a driver under the influence of alcohol is prevented from operating his or her vehicle.

2. Description of the Related Art

The rapid distribution and high solubility of alcohol impairs the central nervous system even in low concentrations. Impairment includes diminution of attention, judgment and control, sensory-motor control, and efficiency in finer performance tests. According to published information, the American Medical Association has defined the blood alcohol concentration (BAC) level of impairment for all people to be 0.04 grams/100 milliliters of blood (equivalent to 0.04 grams/210 liters of breath) Higher concentrations, greater than 0.35 grams/100 milliliters of blood (equivalent to 0.35 grams/210 liters of breath) for example, can lead to coma and death.

The operation of vehicles by persons under the influence of alcohol is a major safety problem in the United States and many other countries. Despite growing public awareness and government concern, statistics continue to show that a high percentage of automobile accidents causing serious bodily injury involve a driver operating under the influence of alcohol.

In order to address this problem, various attempts have been made to develop devices that prevent inebriated persons from operating their vehicles. Typically these devices monitor the blood alcohol content of an individual to determine the ability of an individual to safely operate a vehicle. The result of this test provides an input to an unsupervised interlock device that either enables or disables operation of the vehicle, normally through the ignition system.

Technological advances have resulted in the invention of breath analyzer systems for gathering information about the blood alcohol concentration level of a person that has consumed alcohol. Exemplars of breath alcohol analyzer patents include U.S. Pat. Nos. 4,809,810 and 4,996,161. The '810 patent teaches comparing a reference BAC threshold to the breath sample from an individual, while the '161 patent teaches a system for breath alcohol testing of unsupervised individuals. Patents teaching interlocking a vehicle's ignition based on breath analyzer results include U.S. Pat. Nos. 4,738,333, 4,901,058, 4,926,164, 5,020,628, and 5,426,415.

An example of a commercially available alcohol breath analyzer and vehicle interlock system is a device known as "Smart Start" manufactured by Smart Start, Inc. of Irving, Tex., which is wired into a vehicle's ignition system. To start a vehicle, a driver must first blow into a handheld apparatus that measures breath alcohol levels. If the driver's measured breath alcohol is below the allowed limit, the vehicle starts. If the interlock device detects a higher amount of alcohol, the vehicle won't start. The interlock device is also configured to record a vehicle's operation—including driving logs, disconnection and tampering.

Other systems currently available include Ignition Interlock's LIFESAFER® and Guardian Interlock System's GUARDIAN INTERLOCK®. These devices include a handheld breath-alcohol analyzer and a data logger that records vehicle activities and test results and the time and date at which each took place. With either of these devices, a driver must pass a breath test by blowing into the device before starting the vehicle. Unless the driver passes the test, the vehicle will not start. The units also conduct tests at random intervals once the vehicle has been started to deter the driver from drinking after engine start and continuing to drive while intoxicated.

Other technologies, aside from the breath analyzers, have been combined with automobile interlock systems to prevent an intoxicated person from starting a vehicle. For example, U.S. Pat. No. 5,743,349, issued to Steinberg in 1998, includes a non-invasive reader of a person's blood alcohol concentration in combination with ignition interlock circuitry to prevent operation of a vehicle by an intoxicated person. The non-invasive BAC reader utilizes optical spectroscopic electromagnetic radiation to detect alcohol levels in blood. The sensor is preferably dash mounted and requires the driver to insert his or her finger into the device, and depending upon the result of the test, the operator may be instructed to wait or to find a non-impaired operator.

Similarly, U.S. Pat. No. 6,229,908, issued to Edmonds, III et al. in May 2001, discloses a vehicle interlock device that includes both a blood alcohol detector that measures intensities of wavelengths of light emerging from a finger inserted into the sensor device, as well as a fingerprint scanner, which compares the fingerprint of the user to a prestored image of the fingerprint of the principal driver of the vehicle. Although acceptable for testing a driver at the time of starting the vehicle, the '349 patent is not applicable to continuous BAC testing after engine startup.

Although these aforementioned devices are a good start towards keeping impaired drivers off the road, they fail in several regards. Whether the BAC sensor is a breath analyzer or an optical spectroscopic reader, they all require some positive action by the driver, thereby limiting it to discontinuous operation, once at engine startup, and then randomly during operation of the vehicle.

A technology that offers an alternative approach to non-invasive detection of BAC, as well as continuous BAC testing, is based upon the knowledge that alcohol is eliminated from the body by two mechanisms: metabolism and excretion. Metabolism accounts for greater than 90% of ingested alcohol and occurs principally in the liver. The remaining 10% of ingested alcohol is excreted, unchanged, wherever water is removed from the body, including breath, urine, perspiration, and saliva. The excreted alcohol is significant because it can be measured and correlated to a person's BAC.

U.S. Pat. No. 5,944,661, issued to Swette et al. in 1999, discloses an electrochemical sensor that continuously measures very low concentrations of ethanol vapor at the surface of the skin, as well as skin properties, such as temperature and ionic conductance. Similarly, Secure Continuous Remote Alcohol Monitor® (SCRAM®), manufactured by Alcohol Monitoring Systems, Inc., is a non-invasive alcohol-detection system that automatically tests for blood alcohol content (BAC) by monitoring transdermal alcohol present in insensible perspiration, which is the constant, unnoticeable excretion of sweat through the skin. SCRAM® measures the concentration of ethanol (a byproduct of alcohol consumption) in perspiration, in order to determine a person's BAC.

BAC testing devices are but one embodiment of a larger group of sensing devices for controlling access to equipment and physical facilities based upon personal biometrics. U.S. Pat. No. 5,719,950, issued to Osten et al. in February 1998, discloses such a system that employs the combination of a unique, inherently specific biometric, of which BAC may be such a metric, for authentication of an individual who is not incapacitated.

None of the above inventions and patents, taken either singly or in combination, is seen to describe the instant invention as claimed, nor teach the combination of transdermal alcohol concentration testing sensor with a vehicle interlock system to continuously monitor a drivers BAC level. Thus, an alcohol ignition interlock system and method for continually measuring transdermal blood alcohol concentration and solving the aforementioned problems is desired.

SUMMARY OF THE INVENTION

The alcohol ignition interlock system is a transdermal blood alcohol concentration reader in combination with a vehicle ignition interlock circuit that prevents an intoxicated person from both starting and operating a vehicle.

The blood alcohol concentration reader utilizes a transdermal alcohol sensor mounted on the steering wheel of the vehicle beneath a porous cover that continuously measures very low levels of transdermal alcohol. The readings are communicated to a microprocessor controlled control unit and ignition interlock circuitry that either enables or disables start-up of the vehicle, as well as continued operation thereof.

Not only does the system prevent an intoxicated person from starting the vehicle, but should the system detect the driver's subsequent intoxicated state while in operation of the vehicle, the driver is issued a warning and is provided a period of time and a measured distance in which to pull off the road prior to the ignition system being temporarily disabled. All BAC threshold level timers and counters are factory adjustable to conform to any existing state or local ordinances.

Accordingly, it is a principal object of the invention to provide an alcohol ignition interlock system and method based upon a transdermal alcohol concentration testing sensor and a vehicle interlock system to continuously monitor a driver's BAC level.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an alcohol ignition interlock system, designated generally as 100 in the drawings. The system 100 is designed to prevent an alcohol-impaired individual from either starting the vehicle or from continuing to operate the vehicle once the system has detected a BAC greater than a preset threshold level. The process by which the invention determines alcohol impairment is based upon several factors to be discussed in detail relative to the software flow diagram of FIG. 3.

Figure 1:
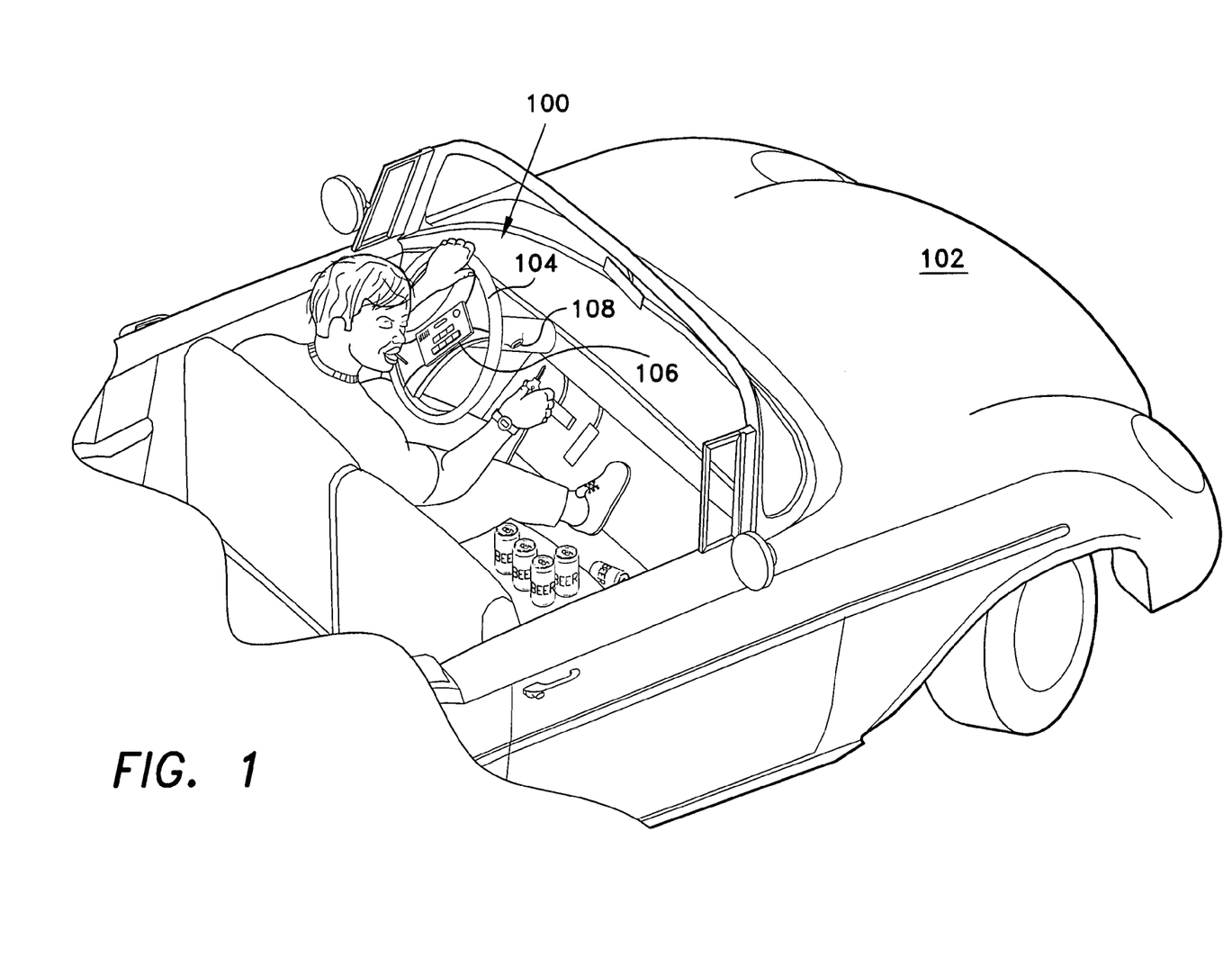
FIG. 1 is an environmental, perspective view of an alcohol ignition interlock system according to the present invention.

FIG. 1 illustrates the typical operation of the system 100, wherein an alcohol-impaired driver is attempting to start his vehicle 102. The alcohol ignition interlock system 100 includes an alcohol sensor built into the steering wheel 104, as well as a control unit 106 that may be mounted on the steering wheel, the dashboard of the car, or other location visually and physically accessible to the driver. The control unit 106 is wired to the ignition switch 108 and controls the flow of current to the ignition system and to the starter motor of the engine.

Figure 2:
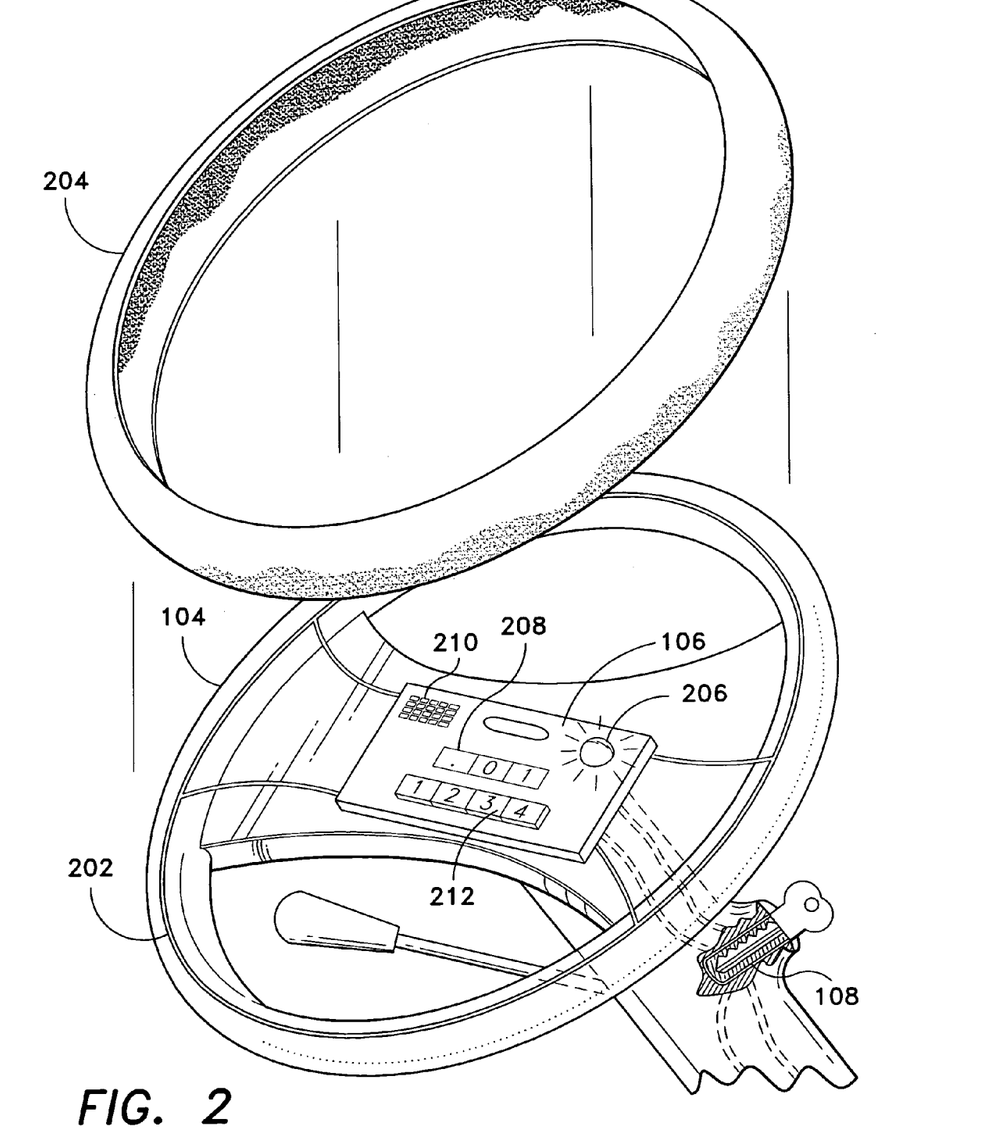
FIG. 2 is an environmental exploded perspective view, partially fragmented and in section, showing attachment of the alcohol ignition interlock system of the present invention to a vehicle.

FIG. 2 shows the steering wheel 104 with the integrated BAC sensor 202 and control unit 106. The BAC sensor 202, located underneath a porous steering wheel cover 204, measures transdermal alcohol concentration, a technology disclosed in U.S. Pat. No. 5,944,661 issued to Swette et al. in 1999, which is hereby incorporated by reference in its entirety. The '661 patent discloses an electrochemical sensor that continuously measures very low concentrations of ethanol vapor at the surface of the skin, as well as skin properties, such as temperature and ionic conductance.

The control unit 106 may be mounted on, the dashboard of the vehicle 102 or on the steering wheel 104, provided that it does not interfere with operation of the driver side air bag (not shown). The control unit 106 is microprocessor controlled and, as shown in the block diagram of FIG. 3, receives input from the BAC sensor 202. Depending upon the BAC concentration reading and the state of the ignition switch 108, the control unit 106 either enables or disables the operation of the ignition system 308 and the starter motor 310, as well as providing both visual and audible indications 314 to the operator.

Referring back to FIG. 2, the front panel of the control unit 106 includes an audible warning annunciator 210 and a display unit 208, which may alternatively display the number of attempted starts within the last fifteen minutes, and by a timer indicator, the time left before the vehicle will be disabled. The control unit 106 may be programmed to alert the driver of his or her impaired state, along with a message indicating any instructions or notice of impending disablement. A keypad 212 provides input to the control logic, to be discussed in detail later, by which means an unimpaired person may reset the alcohol ignition interlock system 100 should the system be disabled and it is necessary to start the vehicle prior to the expiration of the disablement period. The reset logic may be one of a number of different algorithms for testing the mental and physical faculties of a user, including, but not limited to, using the keypad 212 to enter a preset code within a time limit, or the entering of a random code that appears when cued and that must be keyed in within a specific number of seconds.

Figure 3:
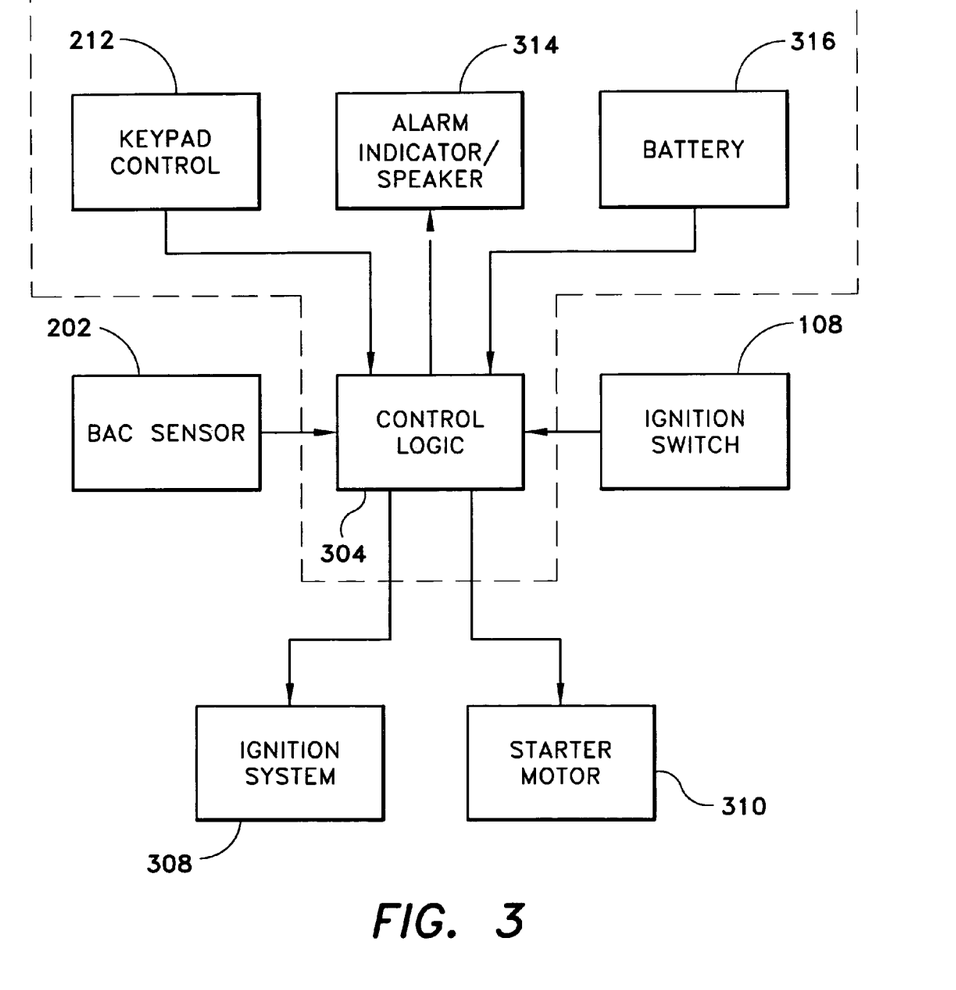
FIG. 3 is a block diagram of the alcohol ignition interlock system according to the present invention.

As detailed in the block diagram of FIG. 3, the alcohol ignition interlock system 100 includes a steering wheel mounted BAC sensor 202 connected to control logic 304, which is further connected to the visual and audible alarm alerts 314. Installation of the system 100 requires the control logic 304 to be wired to the battery 316, ignition switch 108, ignition system 308, and starter motor 310 of the vehicle. Deriving its operative voltage from the battery 316, the control logic 304 controls the output to the starter 310 and the ignition system 308 based upon the state of the ignition switch 108 and the BAC measurement received from the steering wheel mounted BAC sensor 202.

The control logic 304 uses a microprocessor executing a software program stored in memory that operates upon the various sensors and inputs. The microprocessor controls interlock logic that enables or disables the starter 310 and ignition system 308. The interlock logic may be composed of electromechanical or solid state relays. The actual circuit design and component selection is conventional, interlock circuitry being known to those skilled in the art.

Figure 4A:
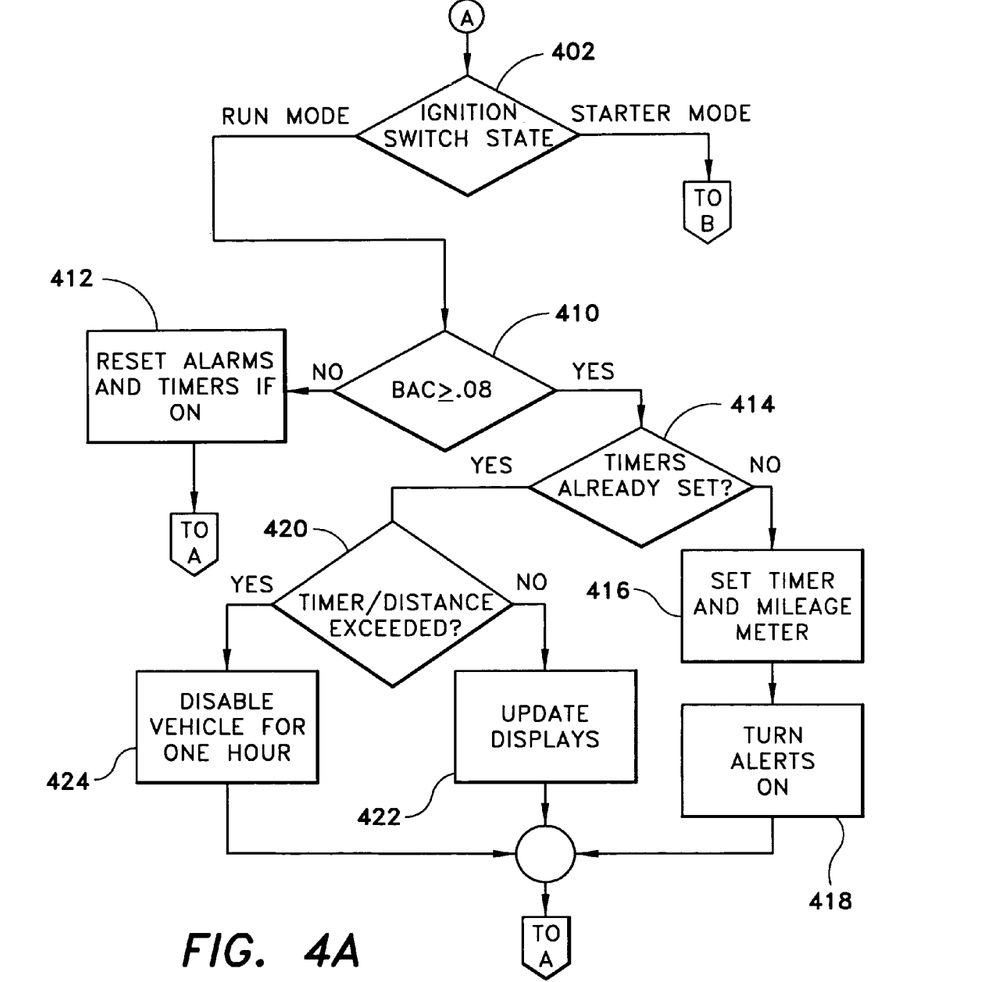
FIGS. 4A and 4B represent a flow chart of the process employed by the alcohol ignition interlock system according to the present invention.
Figure 4B:
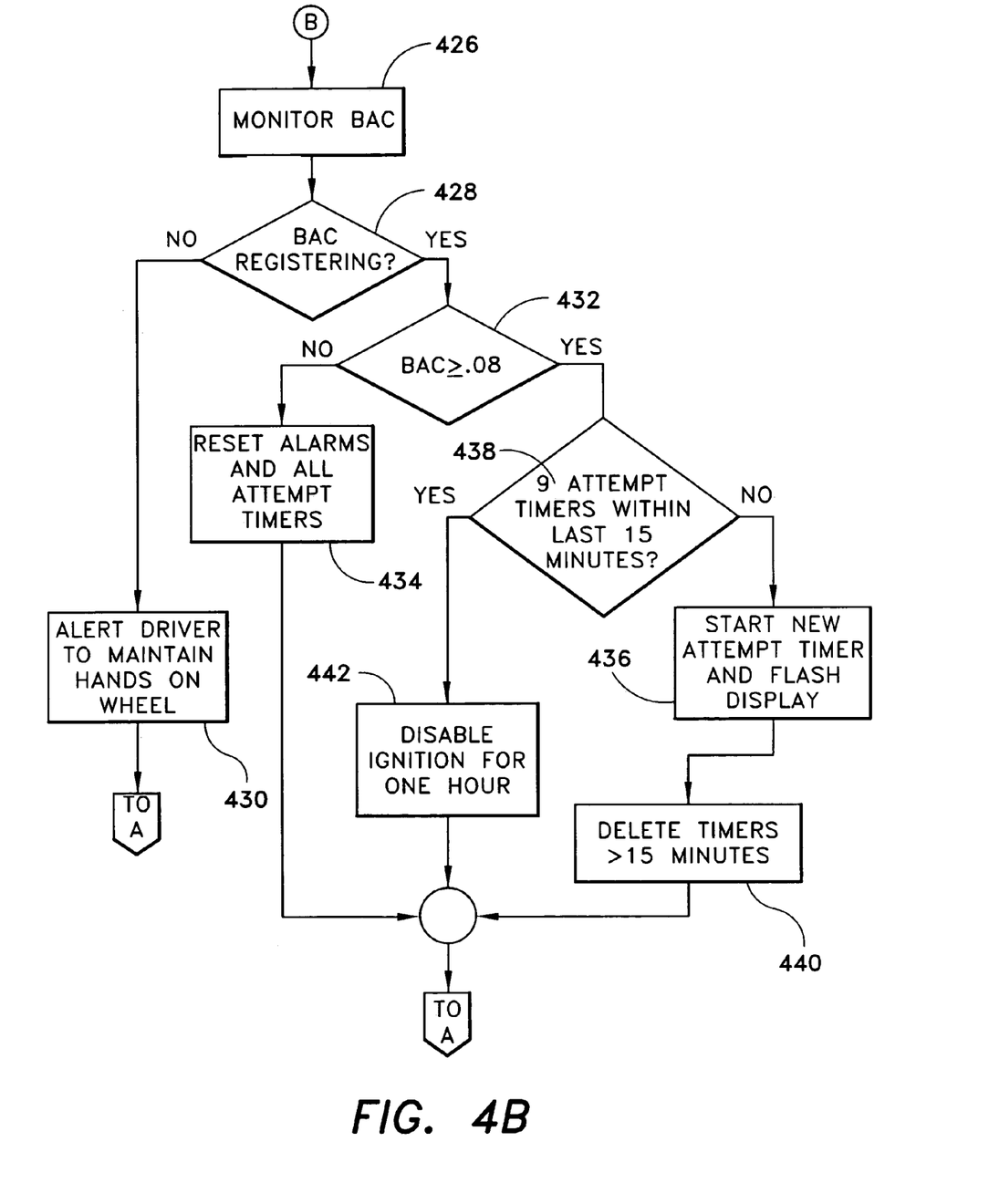

FIGS. 4A and 4B describe one exemplary software process by which the starter 310 and ignition system 308 may be disabled based upon the BAC measurement of the operator. For the purposes of this embodiment, impairment is determined by a BAC reading greater or equal to 0.08%. Readings are taken every fifteen seconds. Should the system 100 determine that the driver's hands are not on the wheel by registering an inappropriate BAC, the driver is alerted to maintain their hands on the wheel. Both the BAC percentage and the period between tests are programmable and non-limiting. The BAC impairment level may be changed based upon local ordinances. Generally, a state of impairment is determined by at least one positive BAC measurement within a predetermined period of time. A determination of non-impairment after a positive reading is based upon at least one negative reading within a predetermined period of time.

The process starts with a determination 402 of the state of the ignition switch 108. Should the driver be attempting to start the vehicle, the logic flows to FIG. 4B where the driver's BAC is tested 426. Should the BAC sensor register 428, a determination is made whether the BAC is greater than or equal to 0.08% at step 432. If the BAC is less than 0.08%, and there have been no previous positive readings, all alarms and attempt timers are reset at step 434 and the starter is engaged. If the BAC is not registering, the driver is alerted to maintain his or her hands on the wheel at step 430.

Should the BAC measurement read greater than or equal to 0.08%, the system determines whether there have been nine previous positive readings greater or equal to 0.08% within the last fifteen minutes 438. If not, a timer is set, a flashing alert indicator is lit and an audible message is generated 436. At this point all timers greater than fifteen minutes are deleted 440 and further samples may be taken. The logic flow is then directed back to the start of the process on FIG. 4A.

Should the system determine that there have been nine previous positive readings grater or equal to 0.08% within the last fifteen minutes, the vehicle is prevented from starting for one hour 442. The period of disablement is programmable and non-limiting.

Once the vehicle has been started, the ignition switch is in the run mode. The state of the ignition switch is determined at process step 402 on FIG. 4A. Step 410 determines if the BAC is greater or equal to 0.08%. If not, the system alarms are reset 412 if enabled, and the process flow returns to the beginning A. Should the BAC be greater or equal to 0.08%, the system determines if the countdown timer to disablement is already started 414. If not already set, the alerts are turned on 418, the process continuing by testing the ignition state at step 402. In order to give the driver time to safely pull off the road, a ten-minute timer is started as well as a mileage meter 416. Once the timer or the mileage meter threshold is tested 420 and met, the vehicle's ignition is disabled for one hour 424. If the threshold is not met, the displays are updated at step 422 and the process is repeated from step 402. As previously stated, all timers, counters, and mileage meters are programmable and non-limiting.

Figure 5:
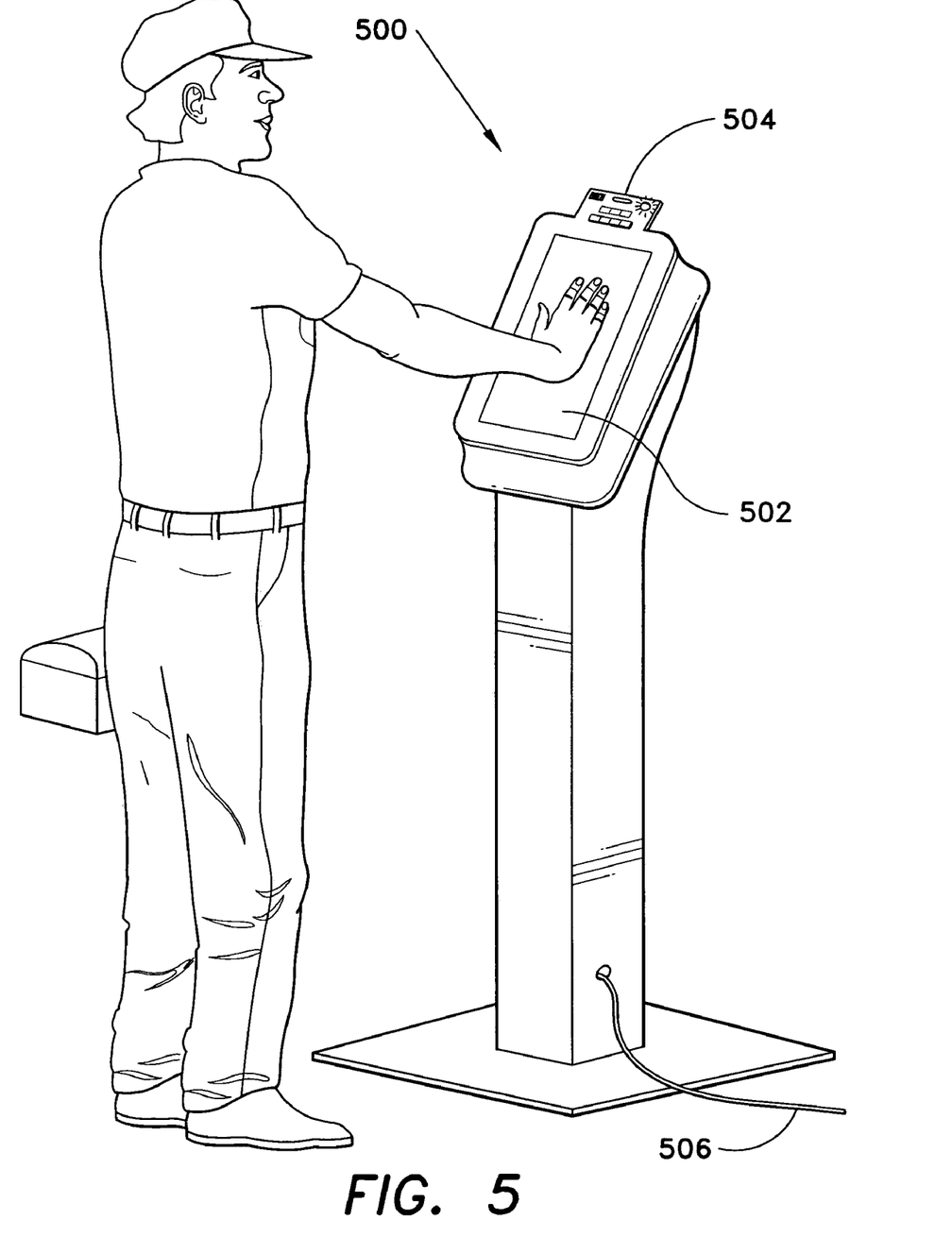
FIG. 5 is a further embodiment of a transdermal alcohol sensing station used to test employees prior to operation of dangerous equipment.

Transdermal alcohol concentration testing interlock devices are not limited to vehicles. Every year workers are severely disabled or killed by operating machines while alcohol impaired. FIG. 5 discloses an embodiment of a transdermal alcohol interlock device 500 whereby operation or access to a machine (not shown) is determined by the BAC reading taken by means of a transdermal alcohol sensor 502 disposed on the device 500. The machine being controlled may be connected to the interlock device 500 by means of a cable 506.

The support structure of the device 500 may be a self-standing unit or a panel mounted device, taking any form known to those skilled in the art of electromechanical controls. The device 500 includes a control panel 504 which may include an identification card scanner or other device whereby the identity of the user is determined. Furthermore, cable 506 provides the means whereby the device 500 may be in electrical communication with a computer for providing data to, or retrieving data from, a centralized database.

It is to be understood that the present invention is not limited to the embodiments described above, but encompasses any and all embodiments within the scope of the following claims.

We claim:

1. An alcohol ignition interlock system for a vehicle having a battery, an ignition switch, a starter motor and an ignition system, the system comprising:
    a steering wheel;
    means for testing the mental and physical faculties of a user, said means comprising:
        a numeric keypad mounted to said steering wheel;
        a display mounted to said steering wheel, said display being in communication with said numeric keypad, said numeric keypad being adapted for entry of an authorizing numeric code by the user;
    a blood alcohol concentration sensor disposed on the steering wheel; and
    an ignition interlock control unit, the input to the control unit being connected to the output of the blood alcohol concentration sensor and to said means for testing the mental and physical faculties of the user, the control unit being adapted for being electrically connected to the vehicle's ignition switch, the starter motor and the battery, the control unit being programmed to disable the starter and the ignition system when the sensor detects a blood alcohol concentration exceeding a programmed limit, the starter further only being enabled upon entry of the authorizing numeric code by the user.

2. The alcohol ignition interlock system according to claim 1, further comprising a porous steering wheel cover disposed over the blood alcohol concentration sensor on the steering wheel.

3. The alcohol ignition interlock system according to claim 1, wherein the ignition interlock control unit includes means for receiving and processing the output of the blood alcohol concentration sensor.

4. The alcohol ignition interlock system according to claim 1, further comprising an audible alarm coupled to the ignition control unit.

5. The alcohol ignition interlock system according to claim 1, further comprising a visual alarm coupled to the ignition control unit.

6. The alcohol ignition interlock system according to claim 1, wherein the numeric code is selected from the group consisting of a pre-set numeric code and a randomly generated numeric code.

7. The alcohol ignition interlock system according to claim 1, further comprising means for resetting the alcohol ignition interlock system.

8. The alcohol ignition interlock system according to claim 7, wherein the means for resetting the interlock system comprises a user input keypad.

9. A method of disabling a vehicle having a battery, an ignition switch, a starter motor, an ignition system and a control unit, the method comprising the steps of:
   determining the state of the ignition switch;
   reading a blood alcohol concentration of a user;
   testing mental and physical faculties of the user through entry of an authorizing numeric code; and,
   based on the blood alcohol concentration and the tested mental and physical faculties, of the user and the state of the ignition switch, instructing the control unit to control a flow of current to the ignition system and the starter motor.

10. The method of disabling a vehicle according to claim 9, further comprising the step of generating an alarm selected from the group consisting of an audible message, a flashing alert, and a combination thereof.

11. The method of disabling a vehicle according to claim 9, further comprising the steps of:
   randomly generating the authorizing numeric code; and
   displaying the authorizing numeric code to the user.

12. The method of disabling a vehicle according to claim 9, further comprising the step of setting a timer.

13. An alcohol ignition interlock system for a vehicle having a battery, an ignition switch, a starter motor and ignition system, the system comprising:
   a steering wheel;
   means for testing mental and physical faculties of a user, said means comprising:
      a numeric keypad mounted to said steering wheel;
      a display mounted to said steering wheel, said display being in communication with said numeric keypad, said numeric keypad being adapted for entry of an authorizing numeric code by the user;
   means for measuring transdermal alcohol concentration incorporated into the steering wheel; and
   means for disabling the starter and the ignition system when a programmed blood alcohol concentration limit is exceeded, the means for disabling the starter being connected to the means for measuring transdermal alcohol concentration.

14. The alcohol ignition interlock system according to claim 13, wherein the means for measuring transdermal alcohol concentration comprises a blood alcohol concentration sensor.

15. The alcohol ignition interlock system according to claim 14, further comprising a porous steering wheel cover disposed over the steering wheel.

16. The alcohol ignition interlock system according to claim 14, wherein the means for disabling the starter and the ignition system comprises an ignition interlock control unit, the blood alcohol concentration sensor producing an output signal received by the control unit, the control unit further being electrically connected to the vehicle's ignition switch, starter motor and the battery, the control unit being programmed to disable the starter and the ignition system when the sensor output signal corresponds to a blood alcohol concentration exceeding a limit programmed into the control unit.

17. The alcohol ignition interlock system according to claim 13, further comprising an alarm coupled to the means for disabling the starter and the ignition system, said alarm being selected from the group consisting of an audible alarm, a visual alarm, and a combination thereof.

18. The alcohol ignition interlock system according to claim 13, wherein the numeric code is selected from the group consisting of a pre-set numeric code and a randomly generated numeric code.

19. The alcohol ignition interlock system according to claim 18, further comprising a random number generator.

20. The alcohol ignition interlock system according to claim 13, further comprising means for resetting the alcohol ignition interlock system.

* * * * *